(12) United States Patent
Kudo (10) Patent No.: US 6,501,503 B2
(45) Date of Patent: *Dec. 31, 2002

(54) IMAGE PICKUP DEVICE HAVING MEANS FOR CORRECTING THE MOTION OF AN IMAGE (75) Inventor: Toshimichi Kudo, Fujisawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,082

(22) Filed: May 28, 1997

(65) Prior Publication Data
US 2001/0012059 A1 Aug. 9, 2001

(30) Foreign Application Priority Data
May 28, 1996 (JP) .............................. 8-133643

(51) Int. Cl.[7] .............................. H04N 5/228
(52) U.S. Cl. .............. 348/208.99; 348/352; 348/208.5; 348/208.2
(58) Field of Search .................. 348/208, 241, 348/352; 396/52, 55, 153, 208.99, 208.1, 208.2, 208.3, 208.4, 208.5 A, 208.6, 208.7, 208.8, 241, 352

(56) References Cited

U.S. PATENT DOCUMENTS

| 5,502,484 | A | * | 3/1996 | Okada | 348/208 |
|---|---|---|---|---|---|
| 5,526,044 | A | * | 6/1996 | Tokumitsu et al. | 348/208 |
| 5,568,190 | A | * | 10/1996 | Noguchi et al. | 348/208 |
| 5,585,875 | A | * | 12/1996 | Imafuji et al. | 348/208 |
| 5,614,945 | A | * | 3/1997 | Sekine et al. | 348/208 |
| 5,619,030 | A | * | 4/1997 | Shiomi | 348/208 |
| 5,648,815 | A | * | 7/1997 | Toba | 348/208 |
| 5,867,213 | A | * | 2/1999 | Ouchi | 348/208 |
| 5,923,368 | A | * | 7/1999 | Hirsawa | 348/208 |
| 5,926,212 | A | * | 7/1999 | Kondo | 348/208 |
| 5,995,151 | A | * | 11/1999 | Hieda | 348/208 |
| 6,014,169 | A | * | 1/2000 | Azusawa et al. | 348/208 |
| 6,029,009 | A | * | 2/2000 | Imura | 396/55 |
| 6,035,133 | A | * | 3/2000 | Shiomi | 396/55 |
| 6,359,648 | B1 | * | 3/2002 | Fukasaka | 348/208 |

* cited by examiner

Primary Examiner—Wendy R. Garber
Assistant Examiner—Jacqueline Wilson
(74) Attorney, Agent, or Firm—Fitzpatrick, Cella, Harper & Scinto (57) ABSTRACT An image pickup device comprises a motion detecting circuit for detecting the motion of the image from an image signal obtained from an image pickup element, a motion sensor for physically detecting the motion of the device, a memory for storing the image signal, a motion correcting circuit for correcting the motion by shifting the image readout position from the memory according to the motion detected by the motion detecting circuit, and a control circuit for controlling the function of the motion correcting circuit according to the output of the motion sensor.

7 Claims, 7 Drawing Sheets

IMAGE PICKUP DEVICE HAVING MEANS FOR CORRECTING THE MOTION OF AN IMAGE

BACKGROUND OF THE INVENTION

1. Field of the Invention

The present invention relates to an image pickup device with image blur correcting function, adapted for use in a video camera or the like.

2. Related Background Art

Image taking equipment such as video cameras or electronic camera in recent years have shown remarkable progress in compactization and in the multitude of functions.

On the other hand, the hand vibration has been a drawback inherent to such equipment. Particularly in a compact video camera, the vibration of the supporting hand or other support may cause a blur in the object image, resulting in an unpleasant image or a deterioration in the resolving power. This phenomenon is particularly conspicuous in the video camera provided with a lens of a high magnification, and the blur becomes larger and more noticeable at the telephoto side.

For this reason there have been proposed and commercialized various video cameras with a function for correcting the image blur resulting from the vibration of hand or of other causes (such function being hereinafter called blur correcting function). An example of such video cameras is a video camera 400 shown in FIG. 1, with electronic blur correcting function.

Figure 1:
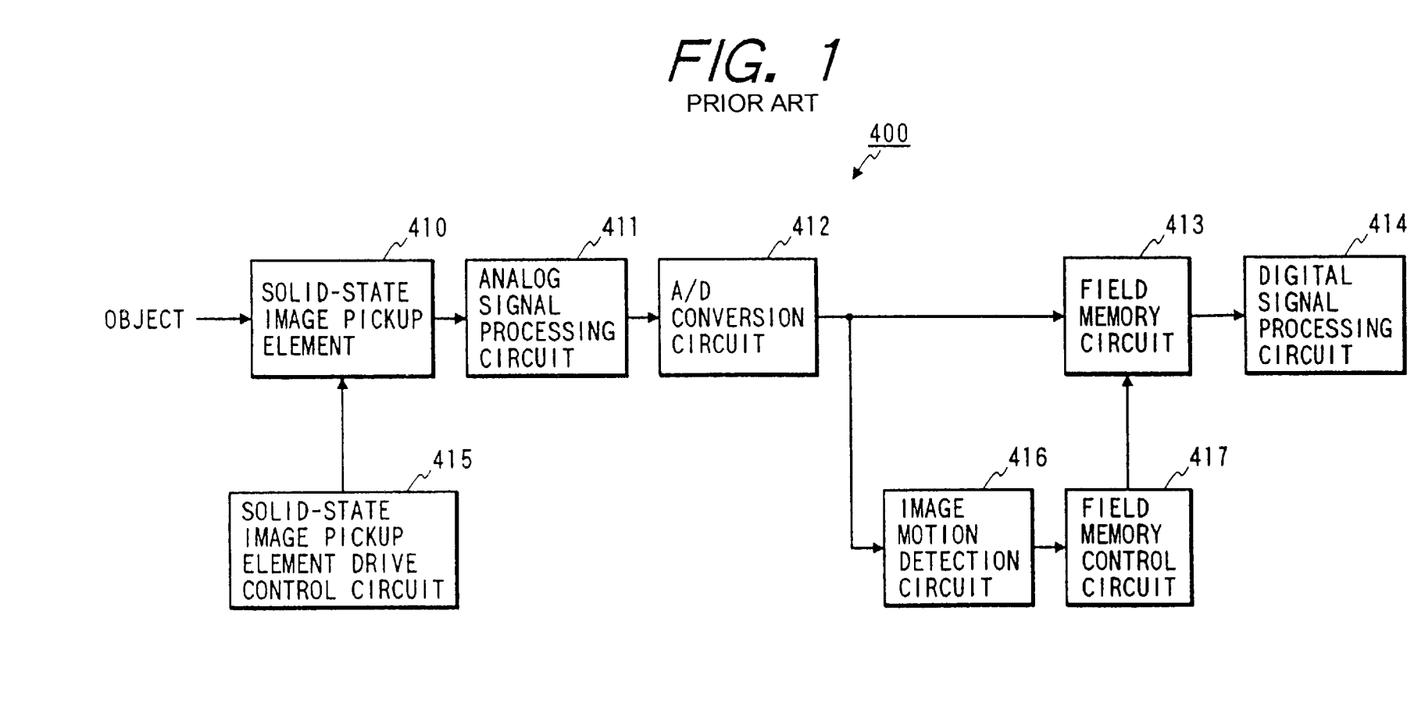
FIG. 1 is a block diagram showing the configuration of a video camera provided with a blur correcting device.

In such video camera 400, an image signal obtained from a solid-state image pickup element 410 under the control of a solid-state image pickup element drive control circuit 415 is supplied to an analog signal processing circuit 411, and, after predetermined signal processing therein, is digitized by an analog/digital (A/D) converting circuit 412 to obtain digital image data, which are stored in a field memory circuit 413 and are supplied to an image motion detecting circuit 416.

In case the video camera 400 is set, by an unrepresented switch, at a mode in which the blur correcting function is activated (hereinafter called blur correcting mode), the image motion detecting circuit 416 executes an image motion detecting process on the image data from the A/D converting circuit 412, and sends the result of detection to a field memory control circuit 417.

In response to the result of detection from the image motion detecting circuit 416, the field memory control circuit 417 controls the reading operation for the image data stored in the field memory circuit 413.

More specifically, the field memory control circuit 417 controls the read-out addresses of the field memory circuit 413 in such a manner that the image data of an area, smaller by a predetermined number of pixels, are read from the field memory circuit 413 to a digital signal processing circuit 414.

The read-out address of the field memory circuit 413 can be moved within an area of the difference between the image data stored in the field memory circuit 413 and those read therefrom.

Thus the field memory control circuit 417 can execute the correction of the image blur by moving the read-out address according to the result of detection from the image motion detection circuit 416, within such movable range of the read-out address.

The image data, read from the field memory circuit 413 under the control of the field memory control circuit 417, are supplied to the digital signal processing circuit 414, and are subjected therein to interpolation to the standard number of pixels matching the predetermined television system. Thus interpolated image data are supplied to and displayed on an unrepresented monitor.

On the other hand, there is known a video camera capable of correcting the image blur, utilizing an angular velocity sensor for detecting the vibration of the hand or of other causes and a variable angle prism (VAP) for correcting the image blur. In such a video camera, the object image is focused on the light-receiving face of a solid-state image pickup device through the VAP, and, in the blur correcting mode, a signal representing the vibration, obtained by a external sensor such as an angular velocity sensor, is subjected to a filtering process consisting of amplification after the elimination of the DC component thereof and cutting-off of the low-frequency components. Such filtering process provides the target value of the vertex angle of the VAP, according to which the angle of the VAP is varied to achieve optical correction of the image blur. However, if such video camera is stably placed for example on a tripod in the blur correcting mode, the blur of the object image resulting for example from the noises released from the angular velocity sensor may become significant. Therefore, in the video camera of the above-mentioned kind, it has been proposed, in case the video camera is identified to be in a stable state, to eliminate such noises in the output signal of the angular velocity sensor by limiting the frequency band of such output signal with a high-pass filter (HPF) of which cut-off frequency is shifted to a higher frequency. Such method prevents the blur in the object image, resulting from the noises released from the angular velocity sensor.

In the image pickup device such as the video camera 400, however, in case the device is in the blur correcting mode and is free from the vibration caused for example by hand, if the object itself to be captured by the solid-state image pickup element 410 vibrates, such vibration is detected by the image motion detecting circuit 416 and the blur correction is conducted by the result of such detection. In such case, there is encountered a defective situation where the background or the entire image area, which should appear standstill, is displayed in the vibrating state.

Also in the image pickup device such as the video camera with optical image blur correcting function utilizing the angular velocity sensor and the variable angle prism, in case such device is placed in a stable state and is free from the vibration caused for example by hand, the blur in the object image, resulting for example from the noises in the output signal of the angular velocity sensor, is prevented by limiting the frequency band of the output signal of the angular velocity sensor through a shift of the cut-off frequency of the high-pass filter to a higher frequency, but, if the video camera is equipped with the lens of an ultra high magnification, the complete prevention of the image blur cannot be achieved unless the cut-off frequency of the high-pass filter is shifted to a considerably higher frequency.

It is therefore conceivable, in such video camera, to shift the cut-off frequency of the high-pass filter to a considerably higher frequency if the device is in a stable state.

However, if a vibration is suddenly given after such frequency shift, it becomes necessary to execute the blur correction by returning the cut-off frequency of the high-pass filter to the ordinary state, but the returning of the cut-off frequency of the high-pass filter from such considerably higher shifted frequency to the ordinary cut-off frequency requires a certain time. For this reason, there is required an additional time before the effect of blur correction can be reached.

SUMMARY OF THE INVENTION

The present invention is proposed to resolve the drawbacks mentioned above, and a first object thereof is to provide an image pickup device capable of providing a satisfactory image, by executing exact blur correction of the image without erroneous operation according to the vibration state of the device.

A second object of the present invention is to provide an image pickup device capable of reducing the time required to obtain the effect of blur correction from the stable state.

The above-mentioned objects can be attained, according to a preferred embodiment of the present invention, by an image pickup device comprising image pickup means for taking the image of an object and thereby generating an image signal, memory means for storing the image signal obtained by the image pickup means, motion detecting means for detecting the motion of the image based on the image signal obtained by the image pickup means, readout control means for reading the image signal from the memory means by controlling the readout address according to the result of detection by the motion detecting means, and vibration detecting means for detecting the vibration of the image pickup means and controlling the function of the readout control means according to the result of such detection.

Also according to another preferred embodiment of the present invention, there is provided an image pickup device comprising image pickup means for taking the image of an object and thereby generating an image signal, vibration detecting means for detecting the vibration of the image pickup means, filter means with variable filter characteristics for passing the detection signal generated by the vibration detecting means, output control means for controlling the output of the filter means, control means for controlling the filter means and the output control means according to the detection signal, and optical vibration blur correcting means for optically correcting the blur in the image taken by the image pickup means, based on the output of the output control means.

Still other objects of the present invention, and the features thereof, will become fully apparent from the following description which is to be taken in conjunction with the attached drawings.

BRIEF DESCRIPTION OF THE DRAWINGS

FIG. 3 is comprised of FIGS. 3A and 3B, which are block diagrams showing the configuration of a second embodiment of the present invention;

DETAILED DESCRIPTION OF THE PREFERRED EMBODIMENTS

In the following there will be explained a first embodiment of the present invention, with reference to the attached drawings.

Figure 2:
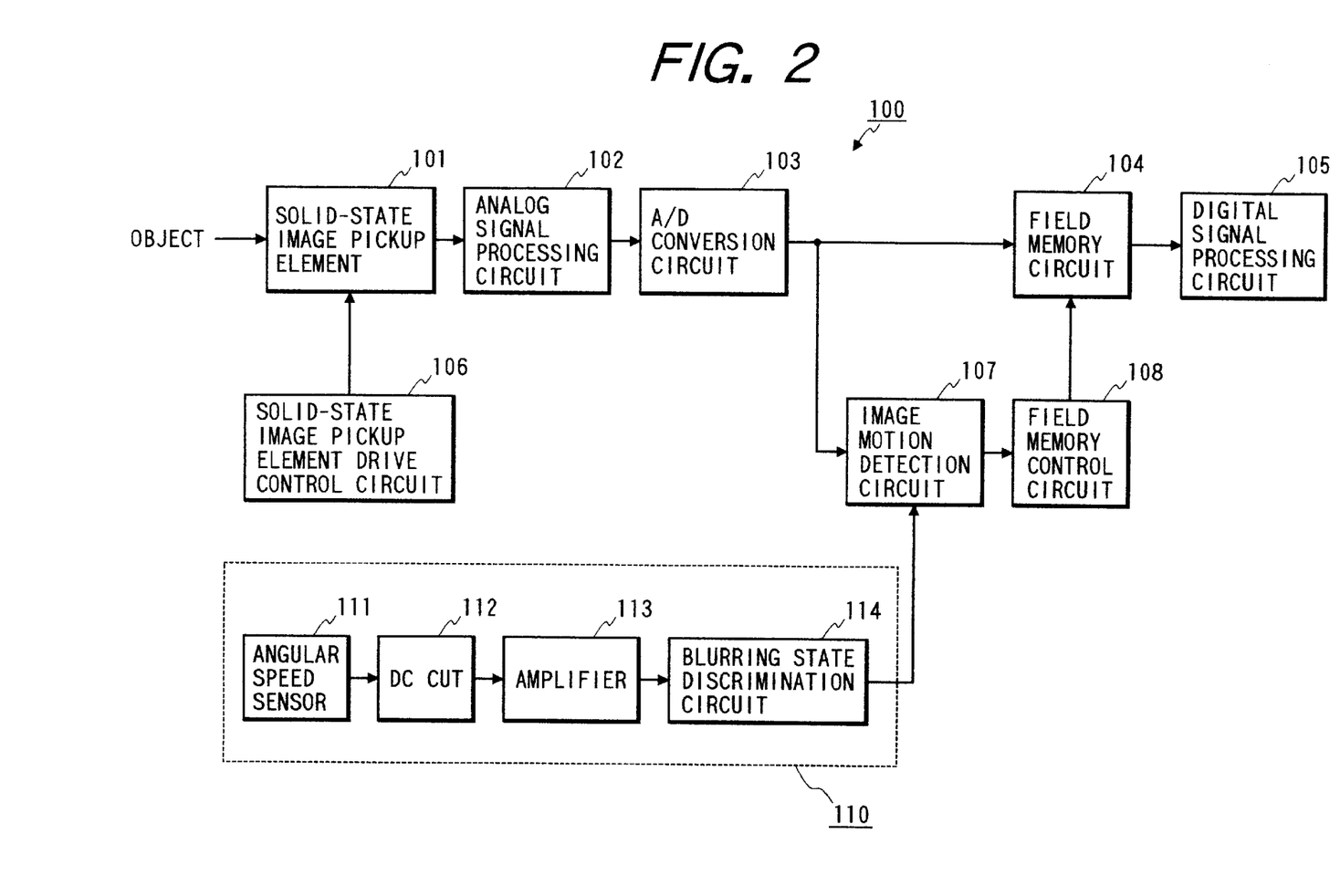
FIG. 2 is a block diagram showing the configuration of a first embodiment in which the present invention is applied to a video camera.

The image pickup device of the present invention is applicable for example to a video camera 100 shown in FIG. 2.

The video camera 100 with electronic blur correcting function is provided, as shown in FIG. 2, with a solid-state image pickup element 101 composed for example of a CCD (charge coupled device), a solidstate image pickup device drive control circuit 106 for controlling the charge accumulation and readout of the solid-state image pickup element 101, an analog/digital (A/D) converting circuit 103 receiving the output of the solid-state image pickup element 101, a field memory circuit 104 receiving the output of the A/D converting circuit 104 and storing the image of an image frame, an image motion detecting circuit 107 receiving the output of the A/D converting circuit 104 and detecting the motion of the image based on the image signal, a field memory control circuit 108 receiving the output of the image motion detecting circuit 107 and controlling the readout position of the image information from the field memory circuit 104, and a digital signal processing circuit 105 receiving the output of the field memory circuit 104.

The video camera 100 is further provided with a blur detecting unit 110 which physically detects the vibration applied to the video camera and is composed, though not illustrated, of two independent blur detecting units, namely a blur detecting unit for the vertical (pitching) direction and that for the horizontal (yawing) direction.

These two blur detecting units have similar configurations, and each is provided with an angular velocity sensor 111, a DC component cut-off filter 112 for receiving the output of the angular velocity sensor 111, an amplifier 113, and a blur state discrimination circuit 114.

As the above-mentioned blur detecting unit for the vertical direction and that for the horizontal direction are of similar configurations and are so designed as to effect similar functions, the blur detecting unit 110 in the following description will be assumed to be the above-mentioned one for the vertical direction, for the purpose of simplicity.

In the following there will be explained the function of the video camera 100 when it is set at the blur correcting mode.

The charge accumulation and readout of the solid-state image pickup element 101 are controlled by the solid-state image pickup element drive control circuit 106, whereby the solid-state image pickup element 101 converts the object image, focused on the light receiving face thereof through an unrepresented optical system, into an electrical signal and sends such electrical signal (hereinafter called image signal) to the analog signal processing circuit 102.

The analog signal processing circuit 102 applies predetermined signal processing to the image signal obtained from the solid-state image pickup element 101, and sends the processed image signal to the A/D converting circuit 103.

The A/D converting circuit 103 digitizes the image signal from the analog signal processing circuit 102, and sends thus digitized image signal (hereinafter called image data) to the field memory circuit 104 and the image motion detecting circuit 107.

The field memory circuit 104 stores the image data of an image frame, supplied from the A/D converting circuit 103.

On the other hand, the image motion detecting circuit 107 detects the motion in the image by applying a motion detecting process to the image data from the A/D converting circuit 103, and supplies the field memory control circuit 108 with the result of detection. The image motion detecting circuit 107 detects the motion in the entire image area by extracting feature points of the image in plural positions within the image area and calculating motion vectors from the changes in the feature points between plural images of different times.

On the other hand, in the blur detecting unit 110, the angular velocity sensor 111 detects the vibration of the video camera 100 in the vertical direction.

The detection signal released from the angular velocity sensor 111 is supplied to the amplifier 113, after elimination of the DC component by the DC cut-off filter 112.

The amplifier 113 amplifies the detection signal, supplied through the DC cut-off filter 112, for supply to the blur state discrimination circuit 114.

The blur state discrimination circuit 114 discriminates, based on the detection signal from the amplifier 113, whether the vibration of the vertical direction is applied to the video camera 100, and sends the result of discrimination to the field memory control circuit 108.

Also the above-mentioned blur detecting unit for the horizontal direction discriminates whether the vibration of the horizontal direction is applied to the video camera 100, in a similar manner as in the blur detecting unit 110 for the vertical direction.

Consequently the field memory control circuit 108 receives the results of discrimination of the vibration in the vertical and horizontal directions.

The field memory control circuit 108 controls the readout operation of the image data from the field memory circuit 104, according to the result of detection of the image motion electronically determined by the image motion detecting circuit 107 and the results of discrimination of the vertical and horizontal directions supplied from the blur detecting units 110.

More specifically, the field memory control circuit 108 so controls the field memory circuit 104 as to read the image data of an area which is smaller by a predetermined number of pixels. Stated differently, the readout area of the memory is smaller than the write-in area thereof.

The readout address of the field memory circuit 104 can be moved within an area of the difference between the image data stored in the field memory circuit 104 and those read therefrom under the control of the field memory control circuit 108.

Thus, the field memory control circuit 108 executes correction of the image blur by moving the readout address of the field memory circuit 104, within the movable range of the readout address, according to the result of detection supplied from the image motion detecting circuit 107.

In such blur correction, the field memory control circuit 108 does not execute the blur correction in the vertical direction or in the horizontal direction respectively in case the video camera 100 is not given the vibration in the vertical or horizontal direction, according to the result of discrimination received from the blur detecting unit 110.

Stated differently, the field memory control circuit 108 executes the correction of the image blur by moving the readout address of the field memory circuit 104, only in case the vibration is applied to the video camera 100 in the vertical or horizontal direction, in the direction of such vibration.

Under the above-explained control of the field memory circuit 104 by the field memory control circuit 108, the image data stored in the field memory circuit 104 are supplied to the digital signal processing circuit 105.

The digital signal processing circuit 105 executes interpolation of the image data supplied from the field memory circuit 104 to match a predetermined television system. Thus interpolated image data are supplied to and displayed on an unrepresented monitor or the like.

As explained in the foregoing, the video camera 100 physically detects whether a vibration is applied thereto in the vertical or horizontal direction, and executes correction of the image blur in the direction of such vibration only if such vibration is applied in the vertical or horizontal direction. Consequently, if the vibration is not applied to the video camera 100 but the object taken by the solid-state image pickup element 101 is vibrating, the correction of the image blur is not conducted even if the video camera 100 is set at the blur correcting mode. It is therefore rendered possible to prevent a situation where the background which should appear still, or the entire image area, is displayed in the vibrating state.

Consequently the video camera 100, being capable of exact correction of the image blur according to the state of vibration applied to the video camera 100, can provide a satisfactory image.

In the following there will be explained a second embodiment of the present invention with reference to the attached drawings.

Figures 3, 3A:
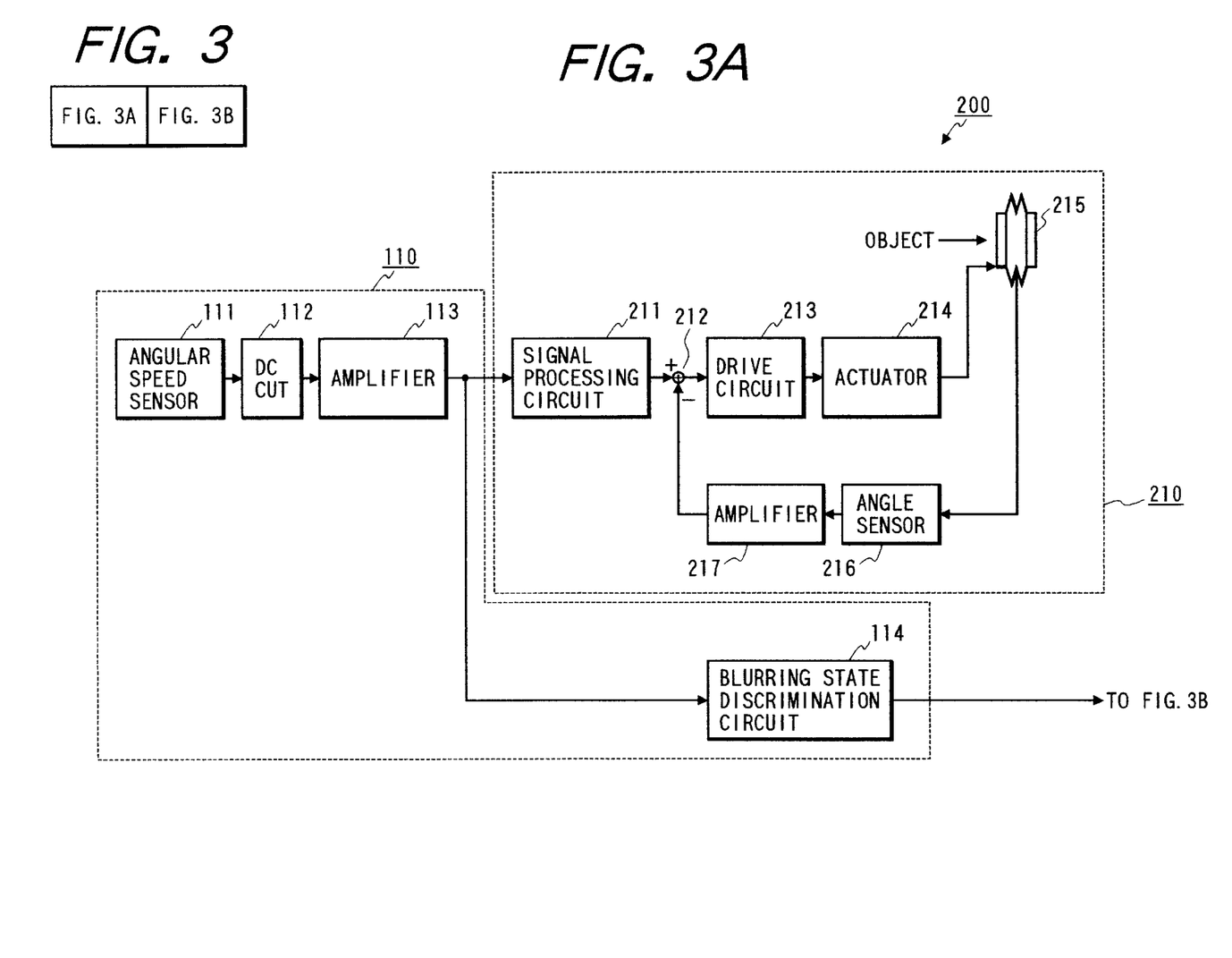
Figure 3B:
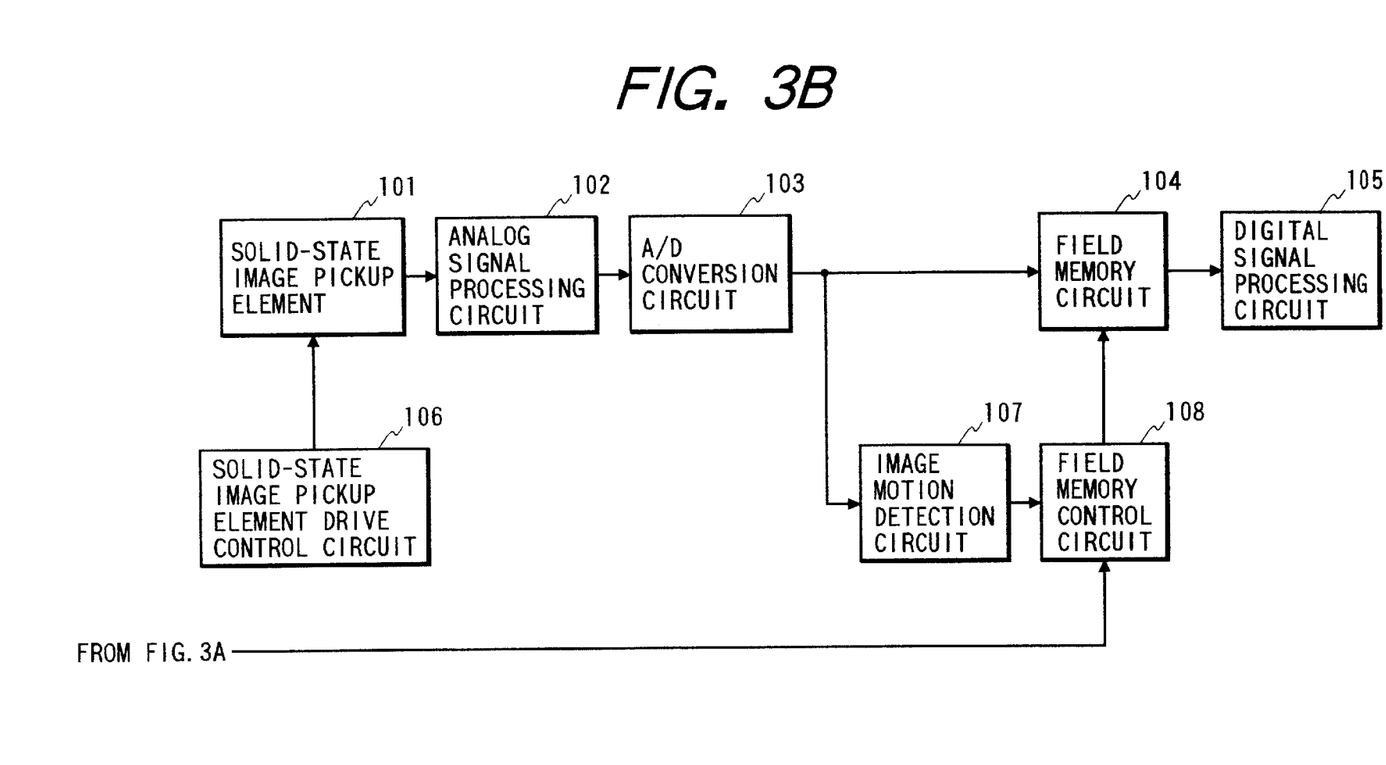

The image pickup device of the present embodiment is applicable, for example, to a video camera 200 as shown in FIGS. 3A and 3B.

The video camera 200 is provided, as shown in FIGS. 3A and 3B, with an optical blur correcting unit 210 for optically correcting the image blur, in addition to the components of the above-explained video camera 100 shown in FIG. 2.

The optical blur correcting unit 210 is composed, though not illustrated, of two independent optical blur correcting units respectively for the vertical (pitching) direction and for the horizontal (yawing) direction, wherein the output of the blur correcting unit for the vertical direction in the blur correcting unit 110 is supplied to the above-mentioned optical blur correcting unit of the vertical direction while that of the blur correcting unit for the horizontal direction is supplied to the optical blur correction unit of the horizontal direction.

In the video camera 200 shown in FIGS. 3A and 3B, components equivalent in function to those in the video camera 100 shown in FIG. 2 are represented by corresponding numbers and will not be explained further.

Also, since the above-mentioned optical blur correcting unit for the vertical direction and that for the horizontal direction have similar configurations and are so designed as to effect similar functions, the blur correcting unit 110 in the following description is assumed as that for the vertical direction and the optical blur correcting unit 210 is assumed as that for the vertical direction, for the purpose of simplicity.

The output of the amplifier 113 is supplied not only to the blur state discrimination circuit 114 but also to optical blur correcting means 210, which is provided with a signal processing circuit 211 for receiving the output of the amplifier 113, an adder 212 for receiving the output of the signal processing circuit 211, a drive circuit 213 for receiving the output of the adder 212, an actuator 214 for receiving the output of the drive circuit 213, a variable angle prism (VAP) 215 for receiving the output of the actuator 214, an angle sensor 216 for receiving the output of the VAP 215, and an amplifier 217 for receiving the output of the angle sensor 216. The adder 212 also receives the output of the amplifier 217.

The VAP 215 is so provided that the image of the object is focused on the unrepresented light-receiving face of the solid-state image pickup device 101 through the VAP 215.

Figure 4:
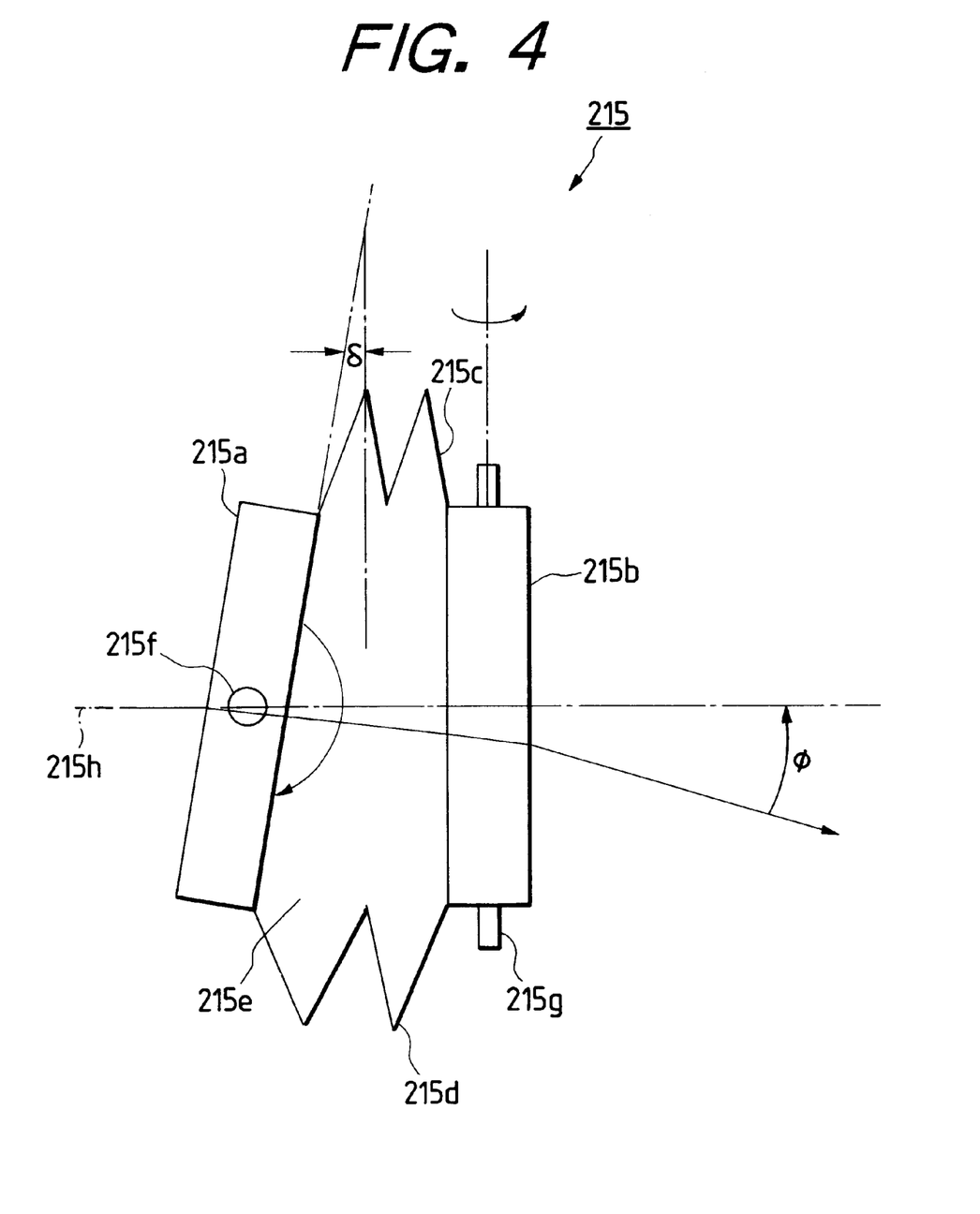
FIG. 4 is a view showing the configuration of a variable angle prism adapted for use in an optical blur correcting unit in an embodiment of the present invention.

The VAP 215 is composed, as shown in FIG. 4, of two mutually opposed glass plates 215a, 215b, bellows 215c, 215d so provided as to connect the two glass plates 215a, 215b, and liquid 215e of a high refractive index filling the space enclosed by the glass plates 215a, 215b and the bellows 215c, 215d, and the glass plates 215a, 215b are respectively provided with rotary shafts 215f, 215g.

In such VAP 215, when a glass plate 215a is rotated by an angle δ about the rotary shaft 215f, the incident light beam 215h is deflected by an angle α by the principle of a wedge-shaped prism, and the incident light beam 215h is similarly deflected when the other glass plate 215b is rotated about the rotary shaft 215g.

The actuator 214 is so provided as to rotate the two glass plates 215a, 215b thereby varying the vertex angle (hereinafter called VAP angle) formed by the two glass plates 215a, 215b. The correction of the image blur is achieved by the variation of the VAP angle.

The signal processing circuit 211 is composed for example of a microcomputer, and effects signal processing for generating the optimum angle (hereinafter called target angle) of the VAP.

In the following there will be explained the function of the optical blur correcting unit 210.

In case the video camera 200 is set at the blur correcting mode, the blur detecting unit 110 detects the vibration of the video camera 200 in the vertical direction by means of the angular velocity sensor 111, and the detection signal obtained in the angular velocity sensor 111 is supplied to the amplifier 113 after the elimination of the DC component by the DC cut-off filter 112. The amplifier 113 amplifies the detection signal supplied through the DC cut-off filter 112, and sends the detection signal to the blur state discrimination circuit 114 and the signal processing circuit 211 of the optical blur correcting means 210.

The signal processing circuit 211 applies predetermined signal processing, for generating the target value of the VAP angle, to the signal from the amplifier 113.

More specifically, the signal processing circuit 211 amplifies the signal from the amplifier 113 after cutting off the DC component, and sends the amplified signal to the adder 212 after cutting off the low-frequency components.

On the other hand, the angle sensor 216 detects the vertex angle of the VAP 215 and sends the corresponding detection signal to the amplifier 217.

The amplifier 217 amplifies the detection signal from the angle sensor 216, for supply to the adder 212.

The adder 212 calculates the difference between the signal subjected to the predetermined signal processing in the signal processing circuit 211 and the detection signal from the amplifier 217, and sends such difference as a control amount to the drive circuit 213.

The drive circuit 213 drives the actuator 214 according to the control amount obtained in the adder 212.

Consequently the angle of the VAP 215 is varied according to the target value mentioned above and is matched with the target value, under the control of the actuator 214 by the drive circuit 213. In this manner the correction of the image blur is achieved for the vibration in the vertical direction.

Also the optical blur correcting unit for the horizontal direction effects the correction of the image blur for the vibration in the horizontal direction, in a manner similar to the above-explained optical blur correcting unit 210 for the vertical direction.

As explained in the foregoing, the video camera 200, being further provided with the optical blur correcting means 210 in the video camera 100 shown in FIG. 2, can achieve correction of the image blur in a more exact manner, according to the state of the vibration applied to the video camera 200.

In the above-explained embodiment, the motion detecting means detects the motion in the image based on the image signal obtained from the image pickup means. The motion detecting means detects the vibration of the image pickup means and controls the function of the readout control means according to the result of the detection. The readout control means reads the image signal from the memory means by controlling the readout address under the control of the blur detecting means, according to the result of detection thereof. Consequently the image blur is corrected according to whether the vibration of the image pickup means is detected or not.

The readout control means executes the above-mentioned control of the readout address only when the blur detecting means detects vibration. Consequently the correction of the image blur is executed only when the vibration is applied to the image pickup means.

Also the optical blur correcting means optically corrects the image blur based on the result of detection by the blur detecting means.

In the following there will be explained a third embodiment of the present invention, with reference to the attached drawings.

Figure 5:
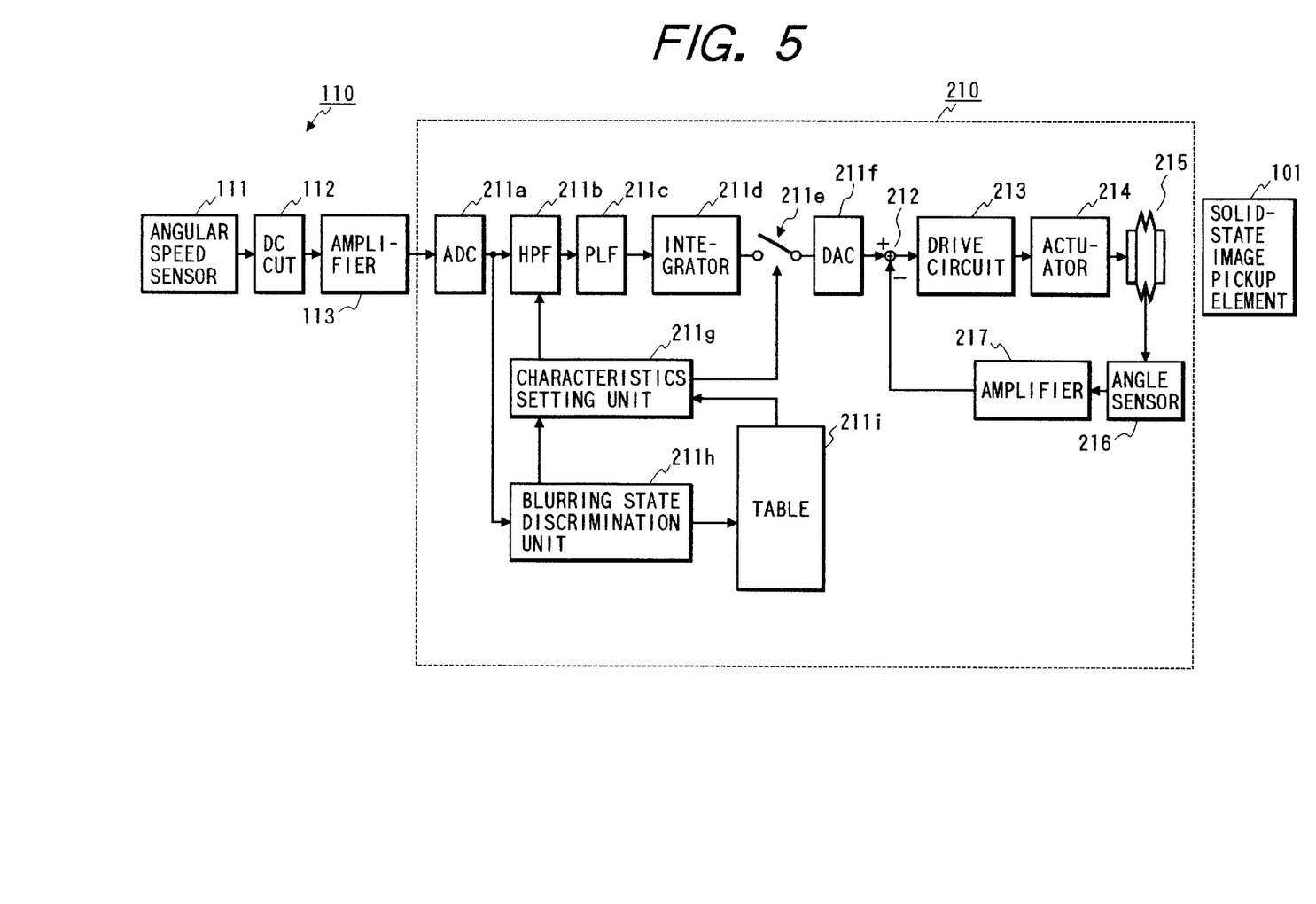
FIG. 5 is a block diagram showing a third embodiment of the present invention.

The image pickup device of the present embodiment is applicable for example to a video camera in which the internal configuration of the optical blur correcting unit 210 shown in FIG. 3A is modified as shown in FIG. 5.

In this video camera, the optical blur correcting unit 210 is provided with an A/D converting circuit 211a receiving the output of the amplifier 113 of the blur correcting unit 110, a high-pass filter (HPF) 211b receiving the output of the A/D converting circuit 211a, a high-frequency phase correction filter 211c receiving the output of the HPF 211b, an integrator 211d receiving the output of the high-frequency phase correction filter 211c, a switch 211e receiving the output of the integrator 211d, a digital/analog (D/A) converting circuit 211f receiving the output of the switch 211e, an adder 212 receiving the output of the D/A converting circuit 211f, a drive circuit 213 receiving the output of the adder 212, an actuator 214 receiving the output of the drive circuit 213, a VAP 215 receiving the output of the actuator 214, a vertex angle sensor 216 receiving the output of the VAP 215, and an amplifier 217 receiving the output of the angle sensor 216. The adder 212 also receives the output of the amplifier 217.

The optical blur correcting unit 210 is provided with a blur state discriminating unit 211h receiving the output of the A/D converting circuit 211a, and a characteristics setting unit 211g receiving the output of the blur state discriminating unit 211h, and the output of the characteristics setting unit 211g is supplied to the HPF 211b and the switch 211e.

The optical blur correcting unit 210 is further provided with a table 211i, which stores in advance plural constants used by the characteristics setting unit 211g for determining the cut-off frequency of the HPF 211b.

When the video camera is set at the blur correcting mode, the switch 211e is turned on in the optical blur correcting unit 210 to supply the output of the integrator 211d to the D/A converting circuit 211f, but, when the video camera is not set at the blur correcting mode, the switch 211e is turned off whereby the output of the integrator 211d is not supplied to the D/A converting circuit 211f.

Figure 6:
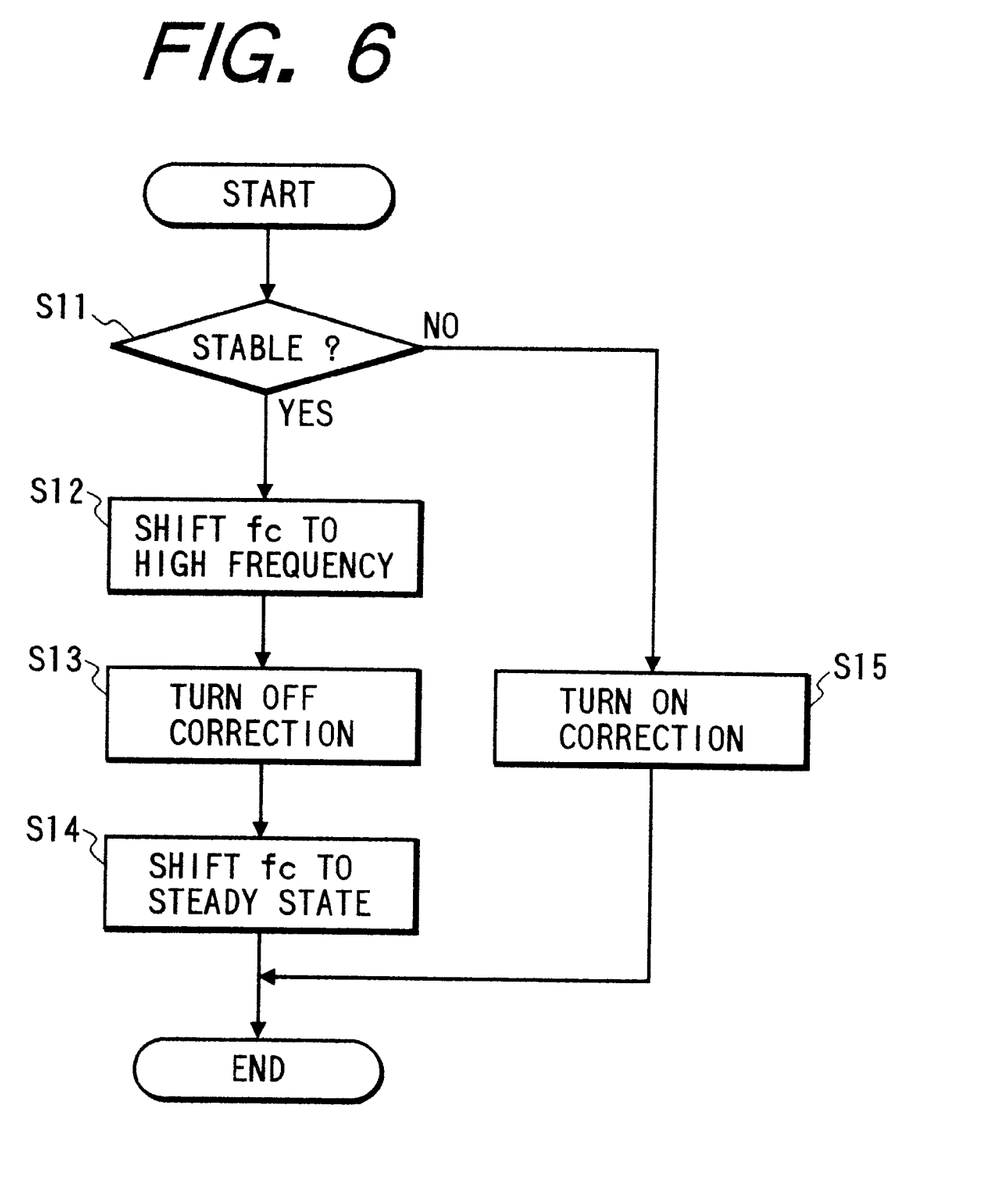
FIG. 6 is a flow chart showing the function of a signal processing circuit in a video camera embodying the present invention.

FIG. 6 is a flow chart showing the process executed in the optical blur correcting unit 210.

In the following there will be explained the function of the optical blur correcting unit 210 with reference to FIGS. 5 and 6.

The optical blur correcting unit 210 shown in FIG. 5 will not be explained in detail as it is similar, except for the internal configuration thereof, to that in the video camera 200 shown in FIGS. 3A and 3B.

In the following description, for the purpose of simplicity, the optical blur correcting unit 210 is assumed to be that for correcting the image blur or the vibration in the vertical direction.

In case the video camera is set at the blur correcting mode, the angular velocity sensor 111 in the blur detecting unit 110 detects the vibration of the video camera in the vertical direction, and the detection signal obtained in the angular velocity sensor 111 is supplied to the amplifier 113 after the elimination of the DC component by the DC cut-off filter 112. The amplifier 113 amplifies the detection signal, supplied through the DC cut-off filter 112, for supply to the A/D converting circuit 211a.

Then the A/D converting circuit 211a digitizes the detection signal from the amplifier 113.

The detection data, obtained by digitization in the A/D converting circuit 211a, are supplied through the HPF 211b, the high frequency phase correction filter 211c and the integrator 211d in succession, to the switch 211e and the blur state discriminating unit 211h.

The switch 211e is turned on in this state, since the video camera is set at the blur correcting mode.

The HPF 211b is rendered capable of arbitrarily varying the cut-off frequency for the detection data from the A/D converting circuit 211a.

At first the blur state discriminating unit 211h discriminates whether the video camera is in a stable state, for example on a tripod, continuously for a predetermined period, and sends the result of discrimination to the characteristics setting unit 211g.

As shown in the flow chart in FIG. 6, the characteristics setting unit 211g discriminates, based on the result of discrimination by the blur state discriminating unit 211h, whether the video camera 200 is in a state continuously for a predetermined period (step S11), and, if the video camera is identified to be in the stable state continuously for the predetermined period, there is selected, among the plural constants set in advance in the table 211i, a constant that shifts the cut-off frequency of the HPF 211b to a higher frequency and the selected constant is set in the HPF 211b (step S12). In this manner the cut-off frequency of the HPF 211b is shifted to a higher frequency.

After the step S12, the characteristics setting unit 211g turns off the switch 211e, whereby the output of the integrator 211d is not supplied to the D/A converting circuit 211f (step S13).

After the step S13, the characteristics setting unit 211g selects, from the table 211i, a constant that shifts the cut-off frequency of the HPF 211b to the stationary state and sets thus selected constant in the HPF 211b (step S14). In this manner the cut-off frequency of HPF 211b is returned to the stationary state.

Thus, in case the video camera is in the stable state continuously for a predetermined period, the characteristics setting unit 211g shifts the cut-off frequency of the HPF 211b to a higher frequency, then the switch 211e is turned off and the cut-off frequency of the HPF 211b is subsequently returned to the stationary state, as explained above. In such case, the D/A converting circuit 211f supplies the adder 212 with such a signal that brings the VAP 215 to the optical center.

In case the step S11 discriminates that the video camera is not in the stable state continuously for the predetermined period, the characteristics setting unit 211g does not execute the steps S12 to S14 but turns on the switch 211e thereby supplying the D/A converting circuit 211f with the output of the integrator 211d (step S15).

Consequently, in this case, the D/A converting circuit 211f receives, through the switch 211e, the detection data of the vibration supplied through the HPF 211b, the high-frequency phase correction filter 211c and the integrator 211d. The D/A converting circuit 211f converts the detection data from the switch 211e into an analog signal and sends the thus obtained analog signal to the adder 212.

On the other hand, the angle sensor 216 detects the vertex angle of the VAP 215 and sends the detection signal to the amplifier 216.

The amplifier 216 amplifies the detection signal from the angle sensor 216, for supply to the adder 212.

The adder 212 calculates the difference between the output signal of the D/A converting circuit 211f, adapted to bring the VAP 215 to the optical center, or the signal obtained from the detection data of the vibration in the vertical direction, and the detection signal obtained from the amplifier 216, and sends such difference as a control amount to the drive circuit 213.

Based on the control amount obtained in the adder 212, the drive circuit 213 drives the actuator 214.

Consequently, under the control of the actuator 214 by the drive circuit 213, the vertex angle of the VAP 215 is varied according to the above-mentioned control amount and is matched with the target value. In this manner the correction of the image blur is achieved for the vibration in the vertical direction.

Also the optical blur correcting unit for the horizontal direction executes the correction of the image blur for the vibration in the horizontal direction, in a similar manner as in the above-explained optical blur correcting unit 210 for the vertical direction.

As explained in the foregoing, in case the video camera is set in the blur correcting mode and is in the stable state continuously for the predetermined period, the optical blur correcting means 210 shifts the cut-off frequency of the HPF 211b to a higher frequency and the switch 211e is turned off, and the cut-off frequency of the HPF 211b is returned to the stationary state, whereby the adder 212 is given a signal that brings the VAP 215 to the optical center.

Consequently, in this case, while the VAP 215 is maintained at the optical center, the optical blur correcting means 210 executes a process that is the same as that used in the case of image blur correction (hereinafter called stationary state). Therefore the effect of the image blur correction can be obtained immediately even in the case where the video camera is shifted from a state of being installed in a stable position to a state where vibration is given suddenly.

In the foregoing embodiment, the blur detecting means detects the vibration in the image pickup means, and the detection signal of the blur detecting means is supplied through the filter means to the output control means. In this state the control means varies the filter characteristics of the filter means according to the detection signal of the blur detecting means, and controls the output control means. In this manner the output control means executes output from the filter means, under the control of the control means. Also the optical blur correcting means optically corrects the blur in the image taken by the image pickup means, according to the output of the output control means. Consequently, the optical correction of the image blur is executed according to whether the vibration of the image pickup means is detected or not.

Also the control means executes control so as to shift the low-frequency range cut-off frequency of the filter means to a higher frequency when the vibration state indicated by the detection signal is stable. Consequently, in case the image pickup means is in a stable state, the frequency band of the detection signal of the blur detecting means becomes limited.

Also in case the vibration state indicated by the detection signal is stable, the control means so controls the output control means as to inhibit the output from being sent to the filter means. Consequently, in case the image pickup means is in a stable state, the detection signal of the blur detecting means is not supplied to the optical blur correcting means, so that the optical correction of the image blur is not conducted.

Also in case the vibration state indicated by the detection signal is stable, the control means controls the output control means in such a manner as to maintain the optical blur correcting means at the optical center. Consequently, when the image pickup means is in a stable state, the optical blur correcting means is maintained at the optical center.

Also in the optical blur correcting means mentioned above, the target value generating means generates the target value of the vertex angle of the variable angle prism, from the detection signal indicating the vibration of the image pickup means, obtained from the blur detecting means, and from the detection signal indicating the vertex angle of the variable angle prism, obtained from the angle detecting means. The drive means drives the variable angle prism so as to match the target value obtained by the target value generating means. Consequently the object image is transmitted to the image pickup means when the vertex angle of the variable angle prism reaches the target value mentioned above.

As explained in the foregoing, the embodiment explained above, designed so as to not execute the correction of the image blur in case the vibration is not applied to the device but the object image taken by the image pickup means is vibrating, can achieve correction of the image blur in an exact manner. Consequently there can be obtained a satisfactory display of the image. Therefore, in case the image pickup device is free from external vibration applied for example by a hand but the image taken by the image pickup means is vibrating, there can be prevented the situation where the entire image vibrates by the correction of such external vibration.

Also the vibration is detected in the components of two mutually orthogonal directions and the correction of the image blur is executed in the direction of vibration applied to the image pickup means, whereby the image blur correction can be achieved in more precise manner, thereby providing an even better displayed image.

Also the image blur correction in an optical manner enables the blur correction in more precise manner.

Furthermore, there are cut off noises generated by the angular velocity sensor in order to reduce the time lag in case the image pickup means is shifted from a state in which it is in a stable state continuously for a predetermined period to another state in which it is not in such stable state, whereby the correction for the image blur is not conducted on the blur of the object image resulting from such noises, and it is therefore rendered possible to execute the image blur correction in an exact manner and to reduce the time required for obtaining the effect of the image blur correction. Consequently the effect of the image blur correction can be obtained immediately even in case a vibration is applied suddenly to the image pickup device while it is placed in a stable state.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup device comprising:
   image pickup means for taking an image of an object and generating an image signal;
   detecting means for detecting vibration of said image pickup means;
   filter means with variable filter characteristics, for passing a detection signal of said detecting means;
   output control means for controlling the output of said filter means;
   blur correcting means for correcting blur of the image taken by said image pickup means, based on the output of said output control means; and
   control means for controlling said filter means and said output control means according to the detection signal to elevate a low-region cut-off frequency of said filter means in case a vibration state indicated by the detection signal is stable.

2. An image pickup device according to claim 1, wherein said control means executes control so as not to release the output of said filter means, in case the vibration state indicated by said detection signal is stable.

3. An image pickup device according to claim 2, wherein said control means releases a signal for maintaining said blur correcting means at an optical center, in case the vibration state indicated by said detection signal is stable.

4. An image pickup device according to claim 1, wherein said blur correcting means includes a variable angle prism that transmits the image of the object to said image pickup means, drive means for driving said variable angle prism, angle detecting means for detecting a vertex angle of said variable angle prism, and target value generating means for generating a target value of the vertex angle of said variable angle prism, from detection results of said detecting means and said angle detecting means, and said drive means drives said variable angle prism in a manner so as to reach the target value generated by said target value generating means.

5. An image pickup device according to claim 1, wherein said detecting means detects vibration in two mutually orthogonal directions.

6. An image pickup device according to claim 1, wherein said detecting means detects vibration using an angular velocity sensor.

7. An image pickup device according to claim 1, wherein said image pickup means includes a solid-state image pickup element.

* * * * *

UNITED STATES PATENT AND TRADEMARK OFFICE
CERTIFICATE OF CORRECTION

PATENT NO. : 6,501,503 B2 Page 1 of 1
DATED : December 31, 2002
INVENTOR(S) : Toshimichi Kudo It is certified that error appears in the above-identified patent and that said Letters Patent is hereby corrected as shown below:

Column 1,
Line 13, "camera" should read -- cameras --.

Column 2,
Line 39, "such" should read -- such a --.

Column 4,
Line 7, "solidstate" should read -- solid-state --.

Column 10,
Line 10, "execute-the" should read -- execute the --.
Line 22, "216." should read -- 217. --.
Line 23, "216" should read -- 217 --.
Line 30, "216," should read -- 217, --.

Column 11,
Lines 56 and 59, "in" should read -- in a --.

Signed and Sealed this

Twenty-seventh Day of January, 2004

JON W. DUDAS
*Acting Director of the United States Patent and Trademark Office*